(12) United States Patent  
Spragg et al.

(10) Patent No.: US 6,436,215 B1  
(45) Date of Patent: Aug. 20, 2002

(54) BAND ELEMENT FOR PNEUMATIC TIRE AND METHOD OF MAKING SAME

(75) Inventors: Charles D. Spragg, Hudson; James M. Kirby, Akron, both of OH (US); Edward G. Markow, Jensen Beach, FL (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/512,740

(22) Filed: Feb. 24, 2000

Related U.S. Application Data

(62) Division of application No. 09/120,210, filed on Jul. 21, 1998.

(51) Int. Cl.[7] .......................... B60C 09/18; B60C 17/00; B29D 30/70

(52) U.S. Cl. ...................... 156/130; 156/148; 156/169; 152/516; 152/526

(58) Field of Search ................................ 156/130, 148, 156/166, 180, 181, 117, 169, 123; 264/137, 171.15–171.17, 171.2, 171.24; 152/516, 526

(56) References Cited

U.S. PATENT DOCUMENTS

| | | | |
|---|---|---|---|
| 1,411,516 A | 4/1922 | Reider | |
| 2,017,071 A | 10/1935 | Minor | 18/59 |
| 3,842,885 A | 10/1974 | Alban | 152/361 R |
| 3,850,219 A | 11/1974 | Snyder | 153/361 DM |
| 3,933,566 A | 1/1976 | Seiberling | 156/272 |
| 3,992,240 A | * 11/1976 | Kuehn, Jr. | 156/250 |
| 4,094,354 A | 6/1978 | Ferrell et al. | 152/361 R |
| 4,111,249 A | 9/1978 | Markow | 152/330 RF |
| 4,287,924 A | 9/1981 | Deck et al. | 152/153 |
| 4,318,434 A | 3/1982 | Markow | 152/156 |
| 4,428,411 A | 1/1984 | Markow et al. | 152/330 RF |
| 4,456,048 A | 6/1984 | Markow et al. | 152/330 RF |
| 4,459,167 A | 7/1984 | Markow et al. | 156/110.1 |
| 4,673,014 A | 6/1987 | Markow | 152/156 |
| 4,734,144 A | 3/1988 | Markow | 156/123 |
| 4,794,966 A | * 1/1989 | Markow | 152/516 |
| 5,368,082 A | 11/1994 | Oare et al. | 152/517 |
| 5,427,166 A | 6/1995 | Willard, Jr. | 152/454 |
| 5,879,484 A | * 3/1999 | Spragg | 152/516 |

FOREIGN PATENT DOCUMENTS

| | | |
|---|---|---|
| EP | 0 191 124 | 8/1986 |
| EP | 0 400 859 | 5/1990 |
| EP | 0 403 420 | 6/1990 |
| EP | 0 537 780 | 4/1993 |
| EP | 0 698 510 | 8/1995 |
| EP | 0 777 066 * | 6/1997 |
| EP | 0 853 009 A2 | 11/1997 |
| JP | 63141809 | 12/1986 |

* cited by examiner

Primary Examiner—Michael W. Ball  
Assistant Examiner—Justin Fischer  
(74) Attorney, Agent, or Firm—Meredith Palmer; Michael Sand

(57) ABSTRACT

A band element for mounting in the crown portion of a pneumatic tire to provide run flat ability to the tire in the event of loss of air pressure and to provide increased puncture resistance. The band is formed of flat strips of tape having fibers embedded in a resin matrix which are twisted and then pultrated to provide a rectangular cross sectional configuration. The twisted tape is wrapped about a mandrel and forms either the only layer, or the intermediate layer of a composite band in combination with inner and outer layers of flat tape or wound filament fibers, whereby the fibers in the tape extend across the central axis of the band to reduce interlaminar sheer. In another embodiment, a plurality of dimples or depressions are formed in the individual tape layers to extend a plurality of the fibers across the layer boundaries to reduce interlaminar sheer.

2 Claims, 14 Drawing Sheets

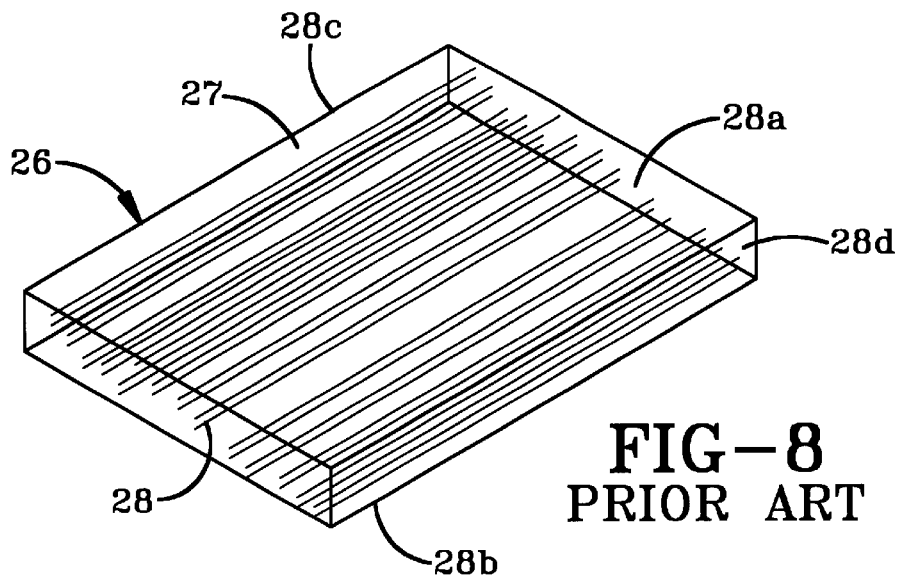
FIG-8
PRIOR ART
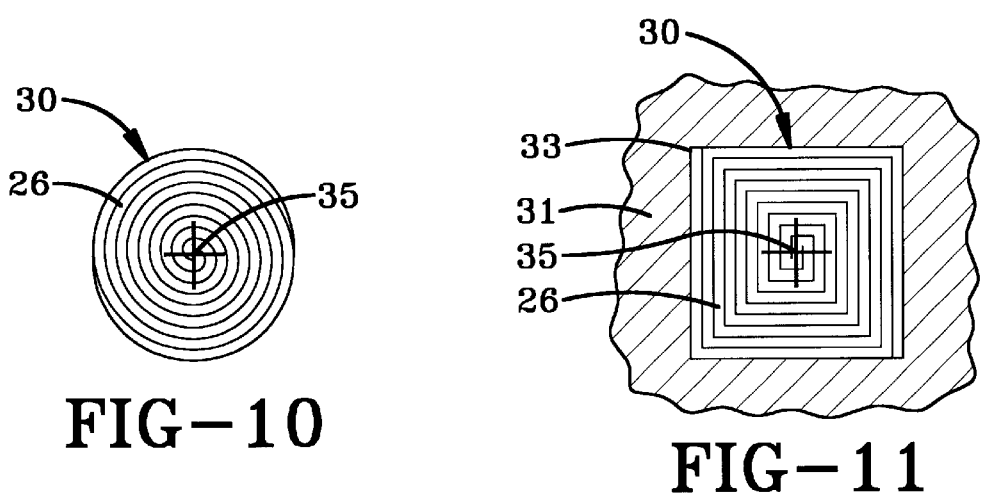
FIG-10
FIG-11
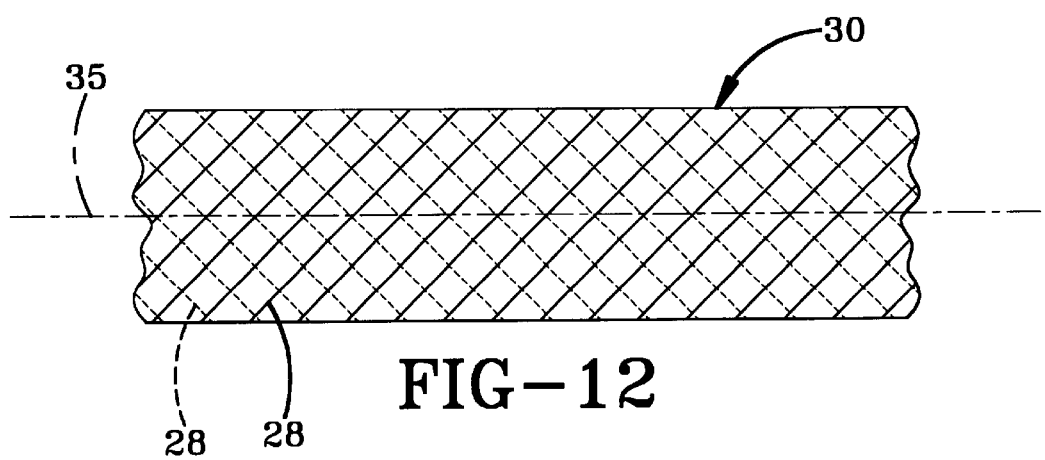
FIG-12

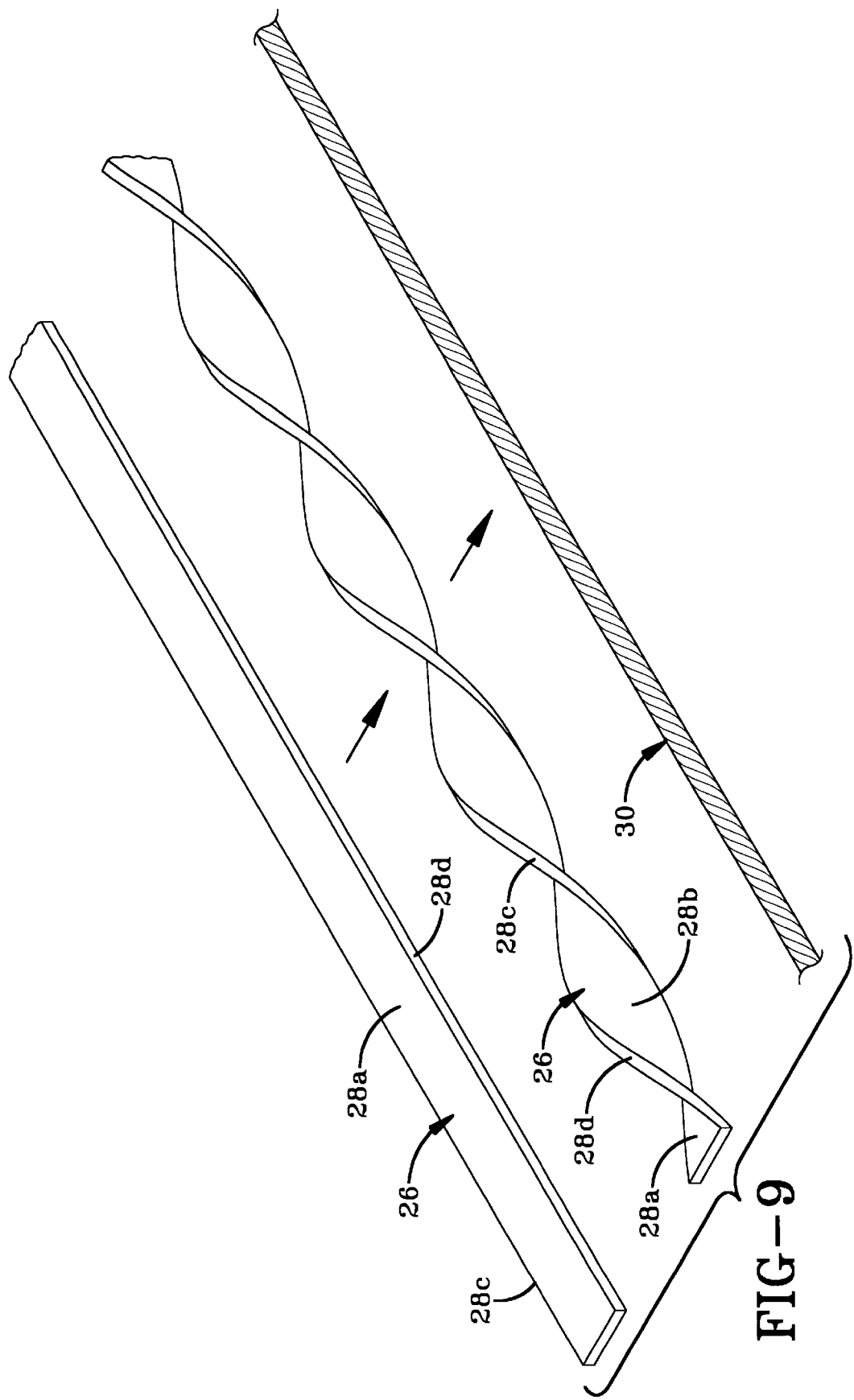

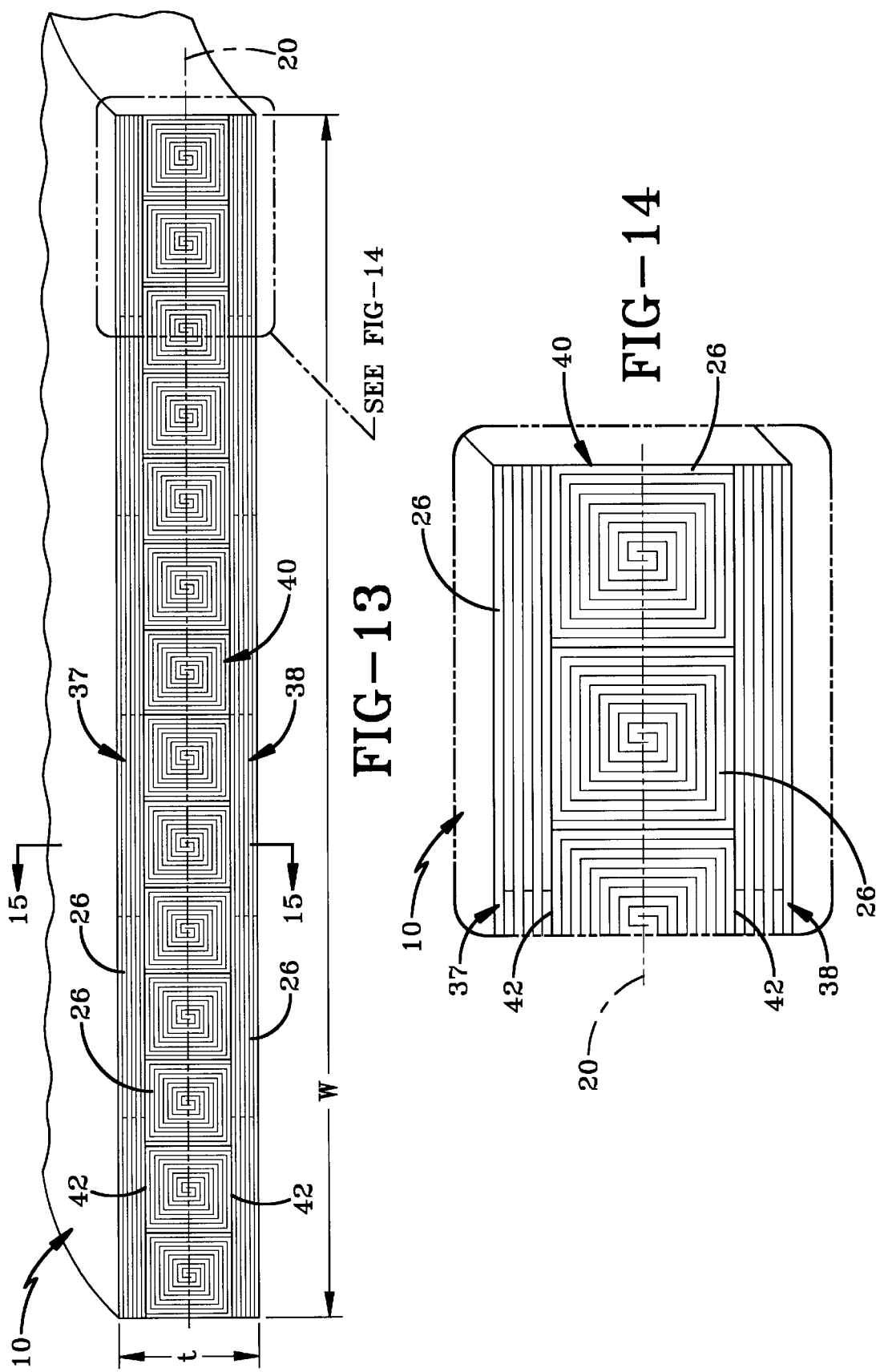

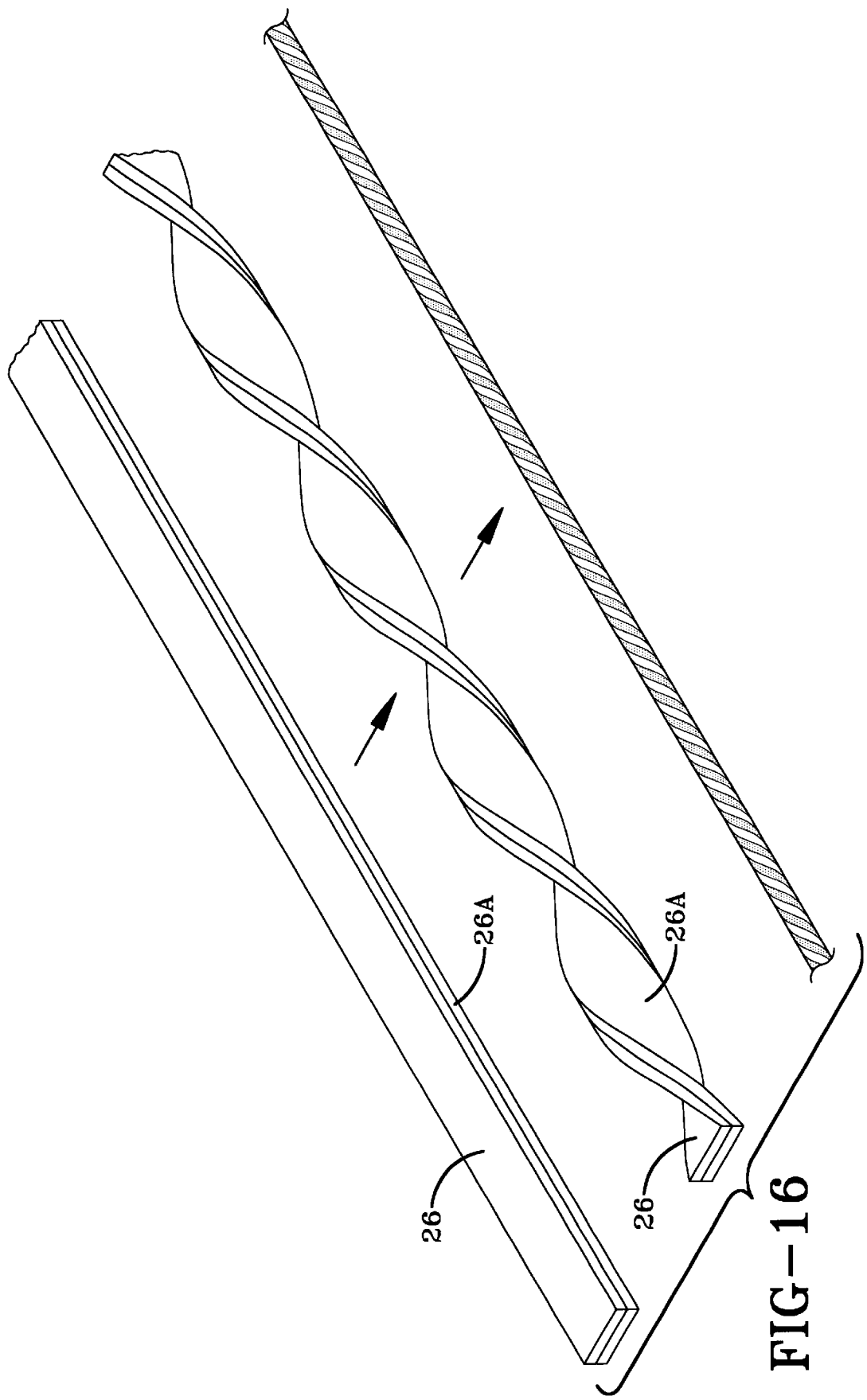

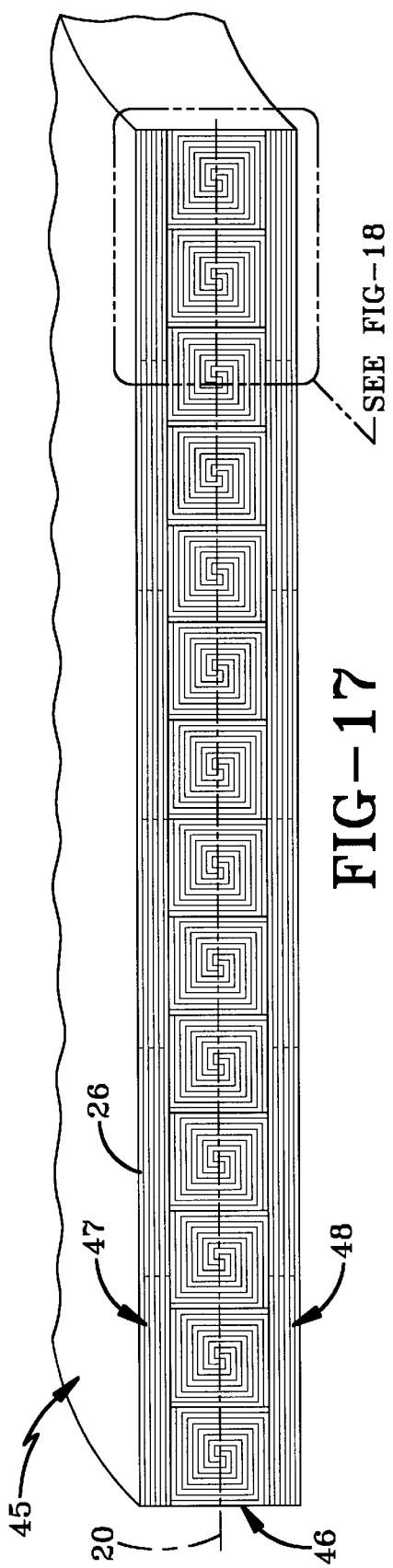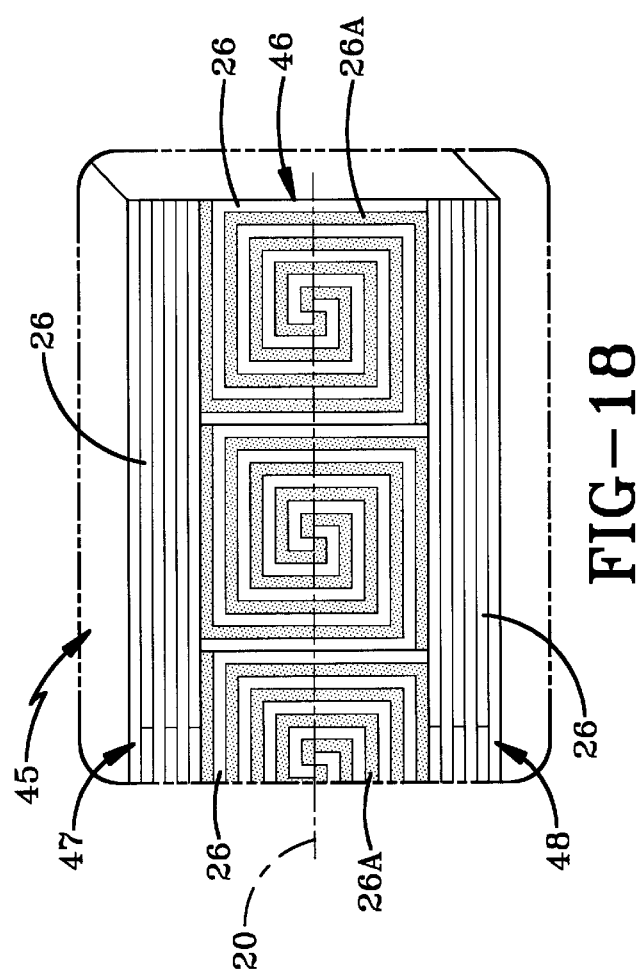

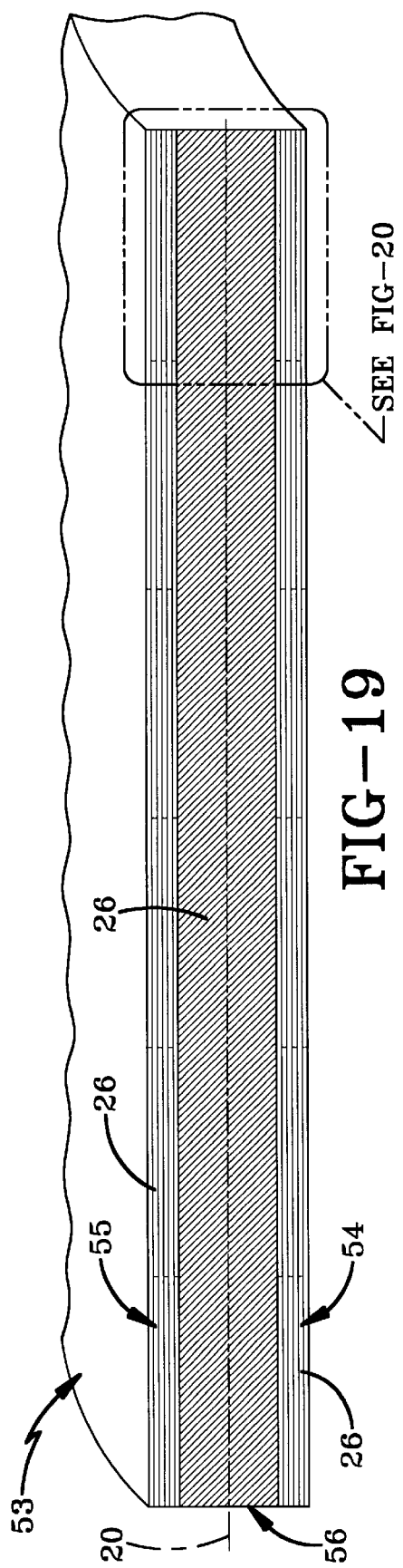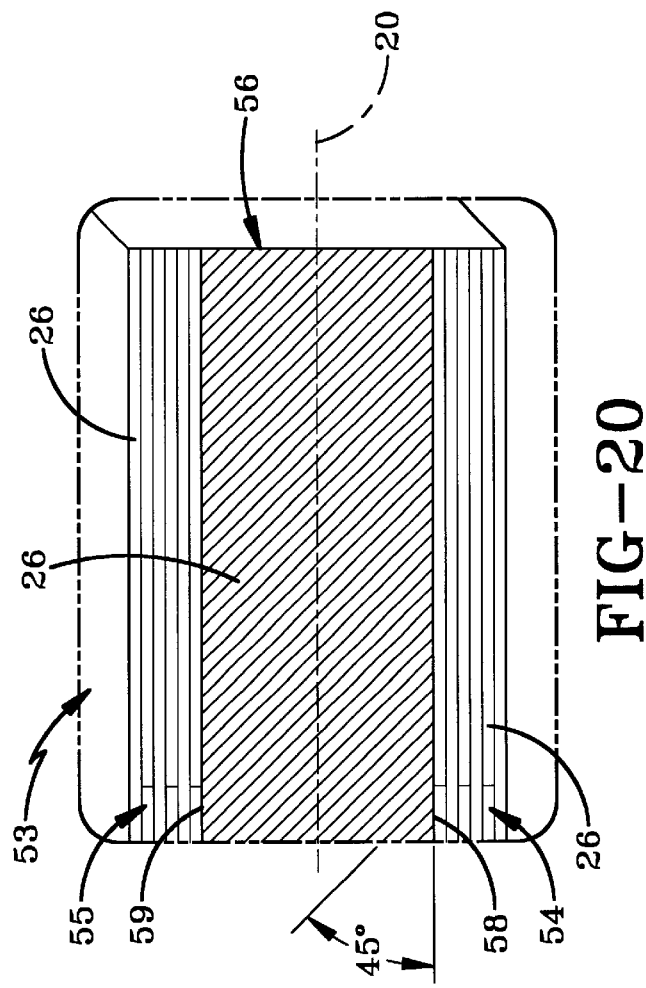

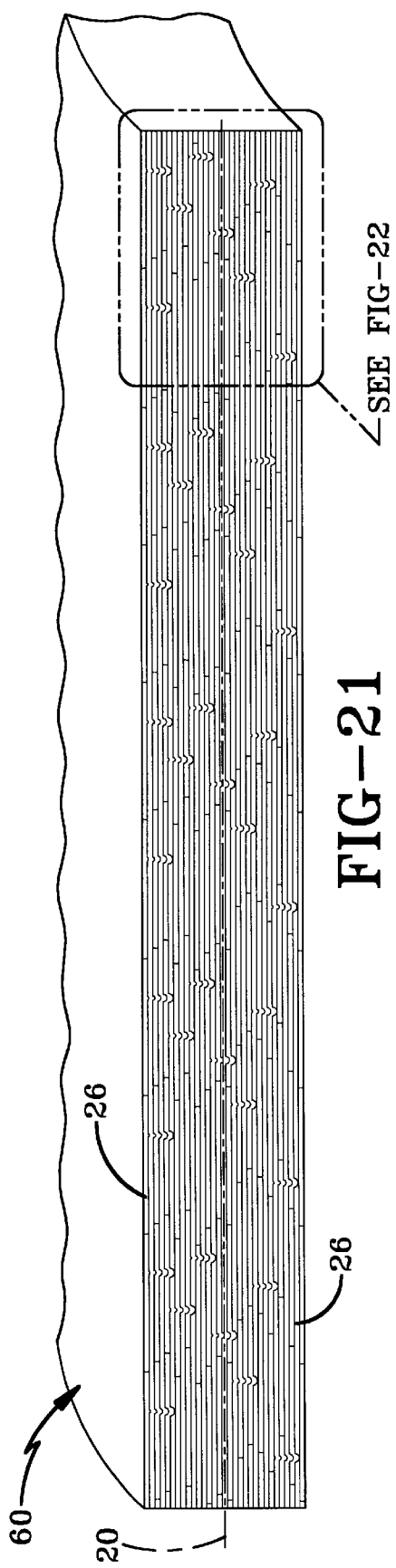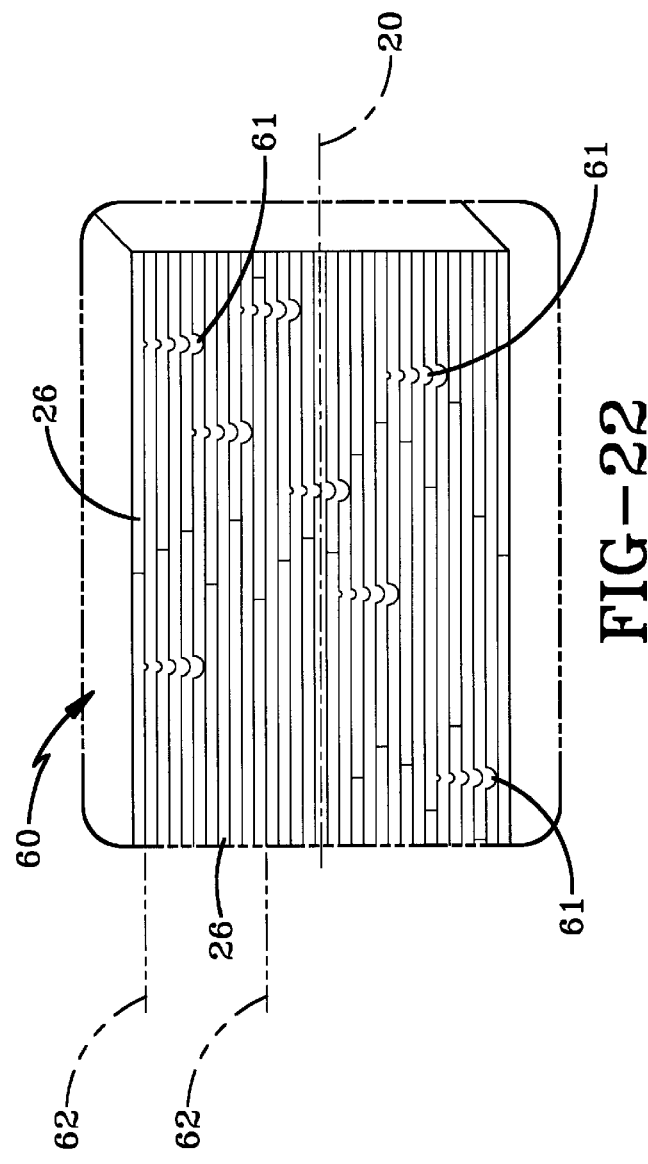
FIG-21
FIG-22

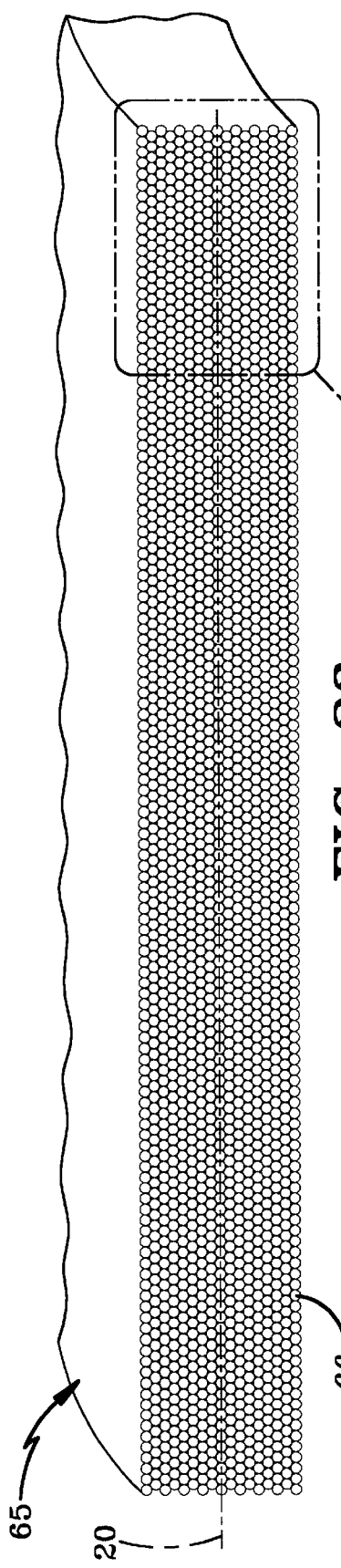
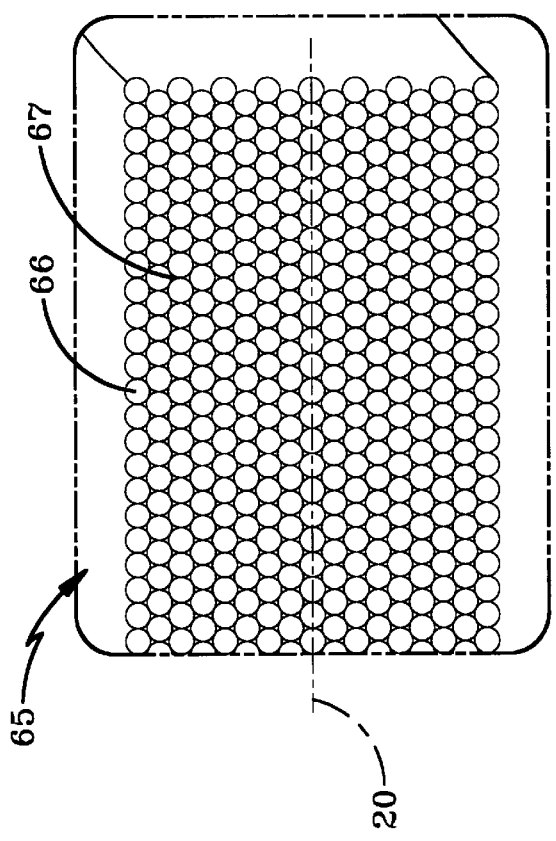

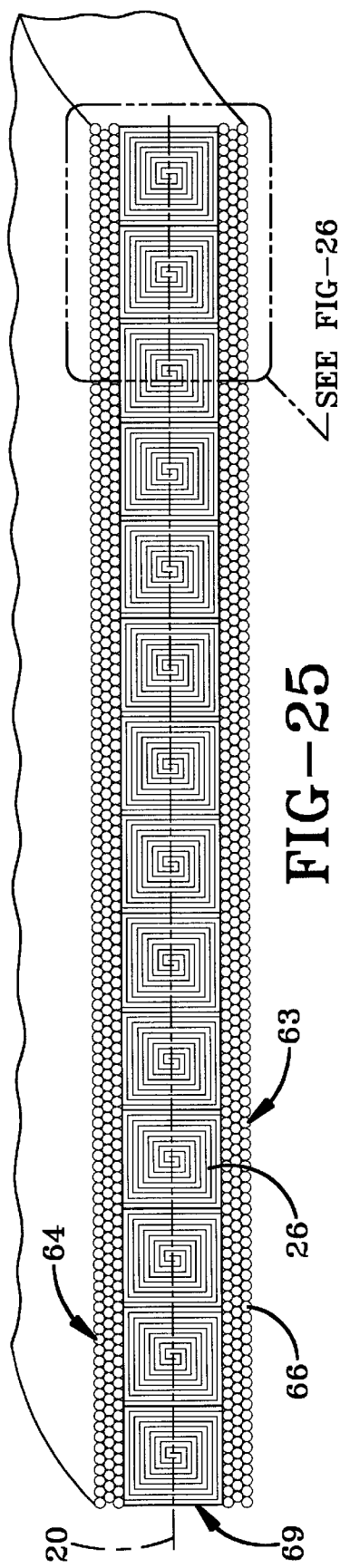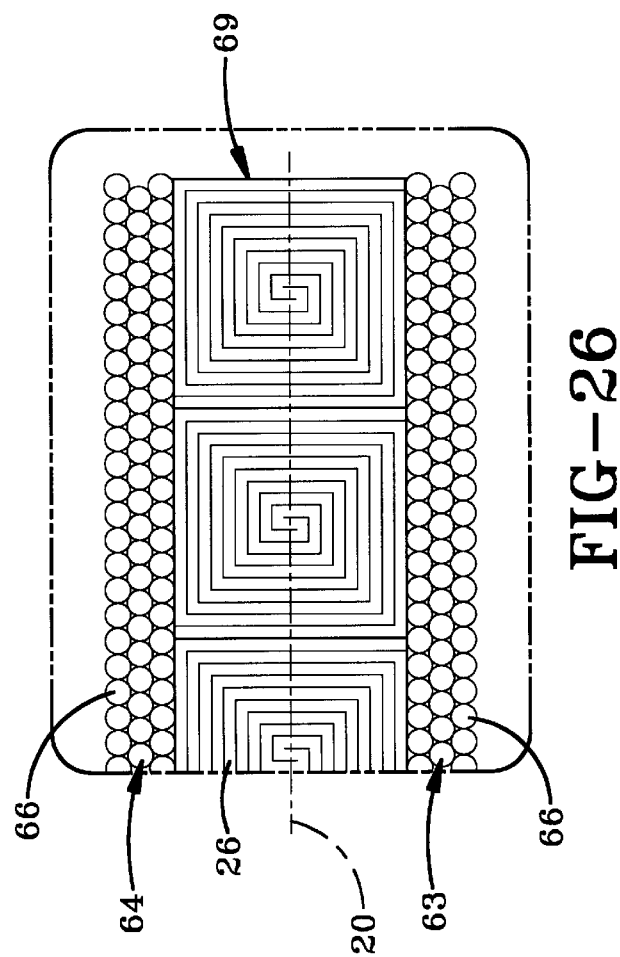

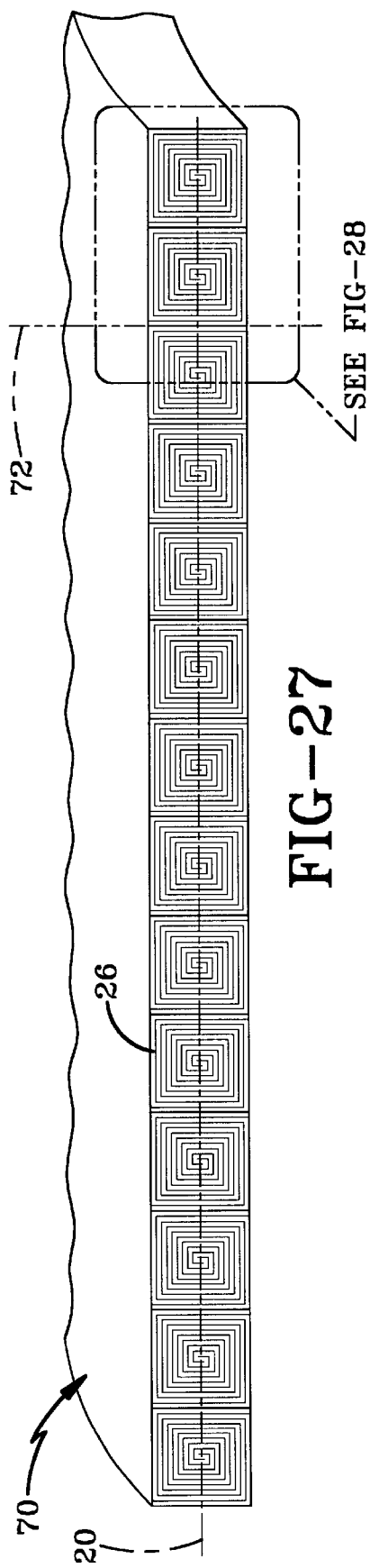
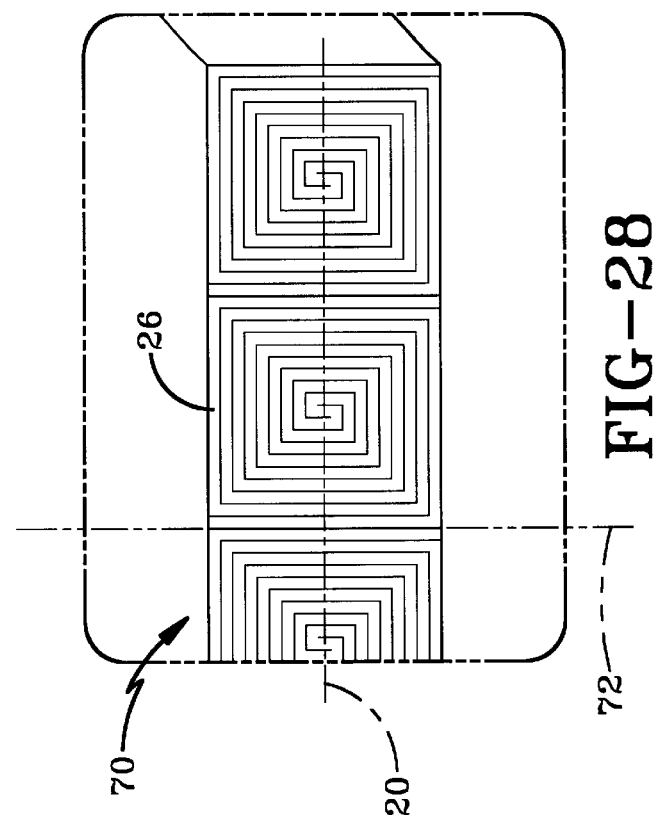
FIG-27
FIG-28

BAND ELEMENT FOR PNEUMATIC TIRE AND METHOD OF MAKING SAME

CROSS REFERENCE TO RELATED APPLICATION

This application is a division of application Ser. No. 09/120,210, filed Jul. 21, 1998.

BACKGROUND OF THE INVENTION

1. Technical Field

The invention relates to reinforced resilient pneumatic tires and more particularly to a vehicle tire reinforced by a thin annular composite band which enables the tire to run in an unpressurized condition and to provide greater puncture resistance for the tire. More particularly, the invention relates to a pneumatic tire in which the band element is formed of twisted material strips having fibers which are oriented within the band to extend across the neutral axis of the band and not fall within the axial plane of the neutral axis to provide the band with enhanced ability to resist interlaminar shear stresses and provide enhanced inflated and uninflated banded tire durability and puncture resistance.

2. Background Information

Various tire constructions have been devised over the years which enable a tire to run in an under-inflated or non-inflated condition, such as after receiving a puncture and loss of pressurized air, for extended periods of time and at relatively high speeds. This enables the vehicle operator to safely drive the vehicle to an appropriate location for repair or replacement of the punctured tire. Certain of these safety tires, referred to as "run flat tires", have been successful for certain applications and certain types of tire constructions. Most of these run flat tires achieve their run flat capability, by the placement of reinforcing layers or members of relatively stiff elastomeric material in the side walls of the tire which enable the tire to support the vehicle weight even with the complete loss of internal air pressure. Examples of such prior art run flat tire constructions which use such sidewall inserts are shown in U.S. Pat. Nos. 3,911,987; 3,949,798; 3,954,131; 4,067,372; 4,202,393; 4,203,481; 4,261,405; 4,265,288; 4,287,924; 4,365,659; 4,917,164; and 4,929,684.

In addition to these prior art run flat tires, various run flat tire constructions have been developed which utilize a thin annular band which extends circumferentially throughout the tire beneath the tread area. Examples of such banded run flat tires are shown in the following patents.

U. S. Pat. No. 4,428,411 describes a method to make a particular band for use in a run flat tire which uses a series of side-by-side elements in the form a helix. The band has hoop compression as against a conventional breaker belt that has no significant compressive strength but is used only to resist tension loads endured by the tire when pressurized.

U.S. Pat. Nos. 4,673,014 and 4,794,966 teach a method to acquire desirable prestressing in a fabricated band made of helical elements. Physically bending the larger diameter helix element around a smaller mandrel and securing it with a resin impregnated tape acquires a desirable level of prestressing.

U.S. Pat. No. 4,456,048 teaches a method of acquiring a change in band stiffness as a function of deflection. The band has a lower stiffness for normal pressurized operation and has a higher stiffness to support load when the tire is uninflated and experiences larger deflection.

Japanese Patent application No. JP 63141809 discloses a run flat tire having a banded element which is formed of layered strips of materials, such as an arramed filament which is impregnated with a high elasticity epoxy resin, which after hardening provides a stiffened band. The tire of this disclosure requires that elastomeric side wall inserts be utilized in combination with the band in order to achieve the desired run flat characteristics.

Other run flat banded pneumatic tires are shown in U.S. Pat. Nos. 4,111,249; 4,318,434; 4,428,411; 4,459,167; and 4,734,144.

Banded tires have been fabricated with band materials made of steel, aluminum, titanium, and epoxy and thermoplastic composites with glass, KEVLAR (aromatic polyamide) and graphite fiber reinforcement. The common failure mode with such lightweight, economical laminate band constructions is interlaminar shear within the band's primary bending neutral axis. This is a fatigue failure and is directly related to the spectrum of cyclic operating stress. As in all fatigue failures, the lower the stress, the longer the operating life. This problem of fatigue failure occurring along the neutral axis of the band resulting in interlaminar shear can be reduced by the prestressing the band during its manufacture, as described in pending patent application Ser. No. 08/782,364.

Numerous prior art pneumatic tires have been provided with an annular band usually of metal, to resist puncture by sharp objects protruding through the tread area. Although these prior art puncture resistant tires utilizing a metal band provide the desired puncture resistance, in most cases, the metal band effects the ride characteristic of the tire and the life expectancy thereof.

Thus, it is desirable to provide a band element for run flat pneumatic tires and for pneumatic tires having greater puncture resistance, with increased resistance to interlaminar shear stress in the inflated deflected banded tire, the uninflated deflected banded tire and the condition of a banded tire encountering a road surface anomaly, which is accomplished without materially increasing the difficulty of the manufacturing process for producing the band element and without materially increasing the cost thereof. The band element of the present invention achieves these results.

SUMMARY OF THE INVENTION

Objectives of the invention include. providing an improved pneumatic tire that is substantially similar in ride, comfort, durability and operation as conventional pneumatic tires, yet which is able to be operated safely at reasonable speeds and for a sufficient number of miles after loss of internal pressurization.

Another objective of the invention is providing such a pneumatic tire and band element therefor which has enhanced load carrying capability, improved endurance by minimizing band stress, and in particular minimizes interlaminar shear stresses heretofore resulting in destruction of the band element.

Still another objective is to provide such a band element for use in a pneumatic tire in which the band element is formed of usual tape strips having longitudinally extending fibers embedded in a resin with the tape being arranged during the construction of the band so that a substantial portion of the fibers extend over the neutral axis of the band which is the area most susceptible to interlaminar shear.

A still further objective of the invention is to provide such a band element for run flat tires in which the individual tape strips which form the band have longitudinally extending fibers embedded within a resin, are twisted into a cylindrical configuration and then pultrated into a rectangular configuration for subsequent wrapping about a mandrel into an annular band having one or more inner and outer layers of the conventional flat tape strips extending about the intermediate pultrated strip layers.

Another objective of the invention is to provide such a band element wherein a plurality of the flat strips containing the longitudinally extending fibers embedded in the resin matrix, are placed in juxtaposition prior to being twisted into a cylindrical configuration for subsequent pultration into a rectangular configuration to provide a stronger layer having the fibers extending across the neutral axis to increase resistance to interlaminar shear.

A still further objective of the invention is to provide such a run flat tire which has increased puncture resistance from the tread contacting road hazards, which can be manufactured at a cost and weight competitive with conventional non run flat tire constructions and which will permit the elimination of a spare tire conventionally required in automobiles thereby providing a cost saving to vehicle manufacturers and owners.

These objectives and advantages are improved by the method of the present invention, the general nature of which may be stated as including a method of forming a thin annular band for embedding in a crown portion of a pneumatic tire including the steps of providing a thin flat strip of material formed with a plurality of longitudinally extending fibers embedded in a resin matrix; twisting the strip until the strip assumes a substantially circular cross section throughout its length; pultrating the twisted strip through a die to provide the strip with a substantially rectangular s cross section; and wrapping the pultrated: strip about a mandrel to form the band having a plurality of adjacent convolutions of said pultrated twisted strip.

These objectives and advantages are further obtained by the improved annular band of the present invention, the general nature of which may be stated as a band for embedding in a crown portion of a pneumatic tire, said band having an axial width and a radial thickness with a neutral axis extending generally through the center of the band in an axial direction, said band further including at least one elongated strip of material having a plurality of longitudinally extending fibers embedded in a resin matrix; said strip being wound into an annular shape having a plurality of adjacent convolutions extending in the axial direction across the band and forming the axial band width, with certain of the longitudinal fibers extending across the neutral axis of the band.

These objectives and advantages are further obtained by providing a pneumatic tire, the general nature of which may be stated as including an elastomeric casing with a tread formed in a crown portion thereof and sidewalls extending from the crown portion to generally circular beads adapted to normally seat themselves in an airtight secured relationship with a wheel; a band member comprising a continuous thin annular composite band fixed in the crown portion of said tire radially inwardly of said tread having an axial width and a radial thickness with a neutral axis extending generally through the center of the band in an axial direction, said band being formed of at least one elongated strip of material having a plurality of longitudinally extending fibers embedded in a resin matrix wound into an annular shape and having a plurality of adjacent convolutions extending in the axial direction across the band and forming the axis width with certain of the longitudinal fibers extending across the neutral axis of the band. dr

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 8 is a very diagrammatic view of a conventional tape depicting the fibers extending longitudinally throughout the tape and contained in a resin;

FIG. 9 is a diagrammatic sequence of steps showing the conventional composite tape of FIG. 8 being modified according to the present invention by applying a wrap or twist thereto;

FIG. 10 is a greatly enlarged diagrammatic transverse sectional view of the twisted tape of FIG. 9;

FIG. 11 is a greatly enlarged diagrammatic transverse sectional view of the twisted tape of FIG. 10 being pultruded through a rectangular die;

FIG. 12 is an enlarged diagrammatic side view of a composite multilayered tape band element showing the twisted fibers in the pultruded tape of FIG. 11 extending across the neutral axis;

FIG. 13 is a view similar to FIG. 6 of a first embodiment of a band element of the present invention formed with the pultruded tape of FIG. 11;

FIG. 14 is a further enlarged diagrammatic view of the encircled portion of FIG. 13;

FIG. 16 is a diagrammatic view similar to FIG. 9 showing the sequence of twisting two adjacent tapes;

FIG. 17 is a diagrammatic end view of a band element similar to FIG. 13, formed with the double twisted tape of FIG. 16;

FIG. 18 is a greatly enlarged view of the encircled portion of FIG. 17;

FIG. 19 is a diagrammatic end view similar to FIGS. 13 and 17 of a modified band element in which inside and outside layers are placed in a wrapped relationship with a central layer formed by placing the flat tape of FIG. 8 at approximately 45 degrees relative to the band element axis;

FIG. 20 is a greatly enlarged view of the encircled portion of FIG. 19;

FIG. 21 is a greatly enlarged diagrammatic end view similar to FIGS. 13, 17 and 19 showing a multilayer tape composite band element providing fibers that cross the neutral axis of the band element by having impressions made in the tape layers;

FIG. 22 is a greatly enlarged view of the encircled portion of FIG. 21;

FIG. 23 is a diagrammatic view similar to FIGS. 13, 17, 19 and 21 of a prior art band element formed of homogenous filaments wound in a uniform distribution and embedded in a resin matrix;

FIG. 24 is a greatly enlarged view of the encircled portion of FIG. 23;

FIG. 25 is a view similar to FIGS. 13, 17, 19, 21 and 23 of another embodiment of a band element of the present invention in which the central portion of the band is formed with the pultruded twisted tape as shown in FIG. 11, and with the inner and outer layers being formed of a uniform distribution of wound filament fibers such as shown in FIGS. 23 and 24;

FIG. 26 is a further enlarged diagrammatic view of the encircled portion of FIG. 25;

FIG. 27 is another embodiment of a band element in which the band is formed as a single layer of the pultruded twisted tape as shown in FIG. 11, without any inner and outer layers; and FIG. 28 is a greatly enlarged view of the encircled portion of FIG. 27.

Similar numerals refer to similar parts throughout the drawings.

DESCRIPTION OF THE PREFERRED EMBODIMENTS

Figure 1:
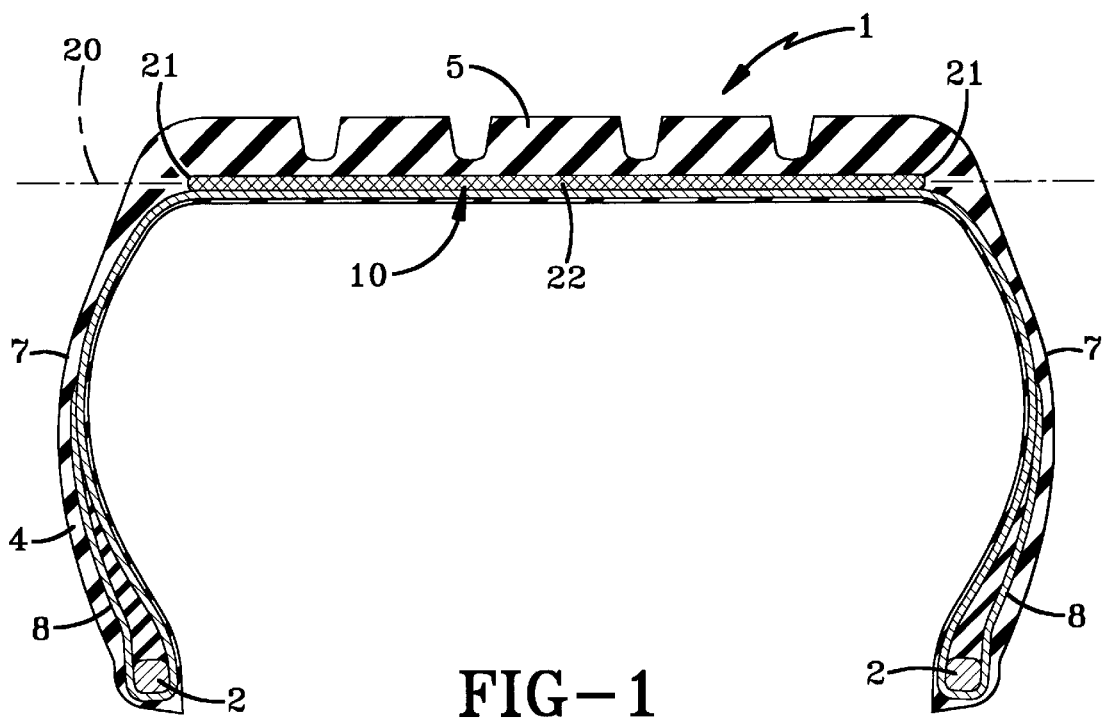
FIG. 1 is a sectional view through a pneumatic tire having the improved band element incorporated therein.

The improved pneumatic tire of the present invention containing the unique band element is indicated generally at 1 and is shown in cross section in FIG. 1. Most of the components of tire 1 are of a conventional design and construction and consists generally of a pair of beads 2 which are adapted to be sealed in an air tight relationship on a wheel. Tire 1 further comprises a carcass or casing 4 having an outer peripheral tread portion 5 formed in a crown region thereof, and sidewalls 7 extending on both sides from the crown portion to beads 2. Tread 5 is formed with a usual tread pattern depending upon the particular characteristics to be achieved by the pneumatic tire and the particular vehicle on which the tire will be mounted.

Sidewalls 7 of the casing are reinforced by usual radial reinforcing elements which extend throughout the sidewalls and are turned up about beads 2. As is well known in the art, sidewall plies are reinforced fibers composed of rayon, nylon, polyester, steel and other types of known materials. These sidewall reinforcements extend from at least the crown portion of the tire and throughout the sidewalls to the bead area thereof.

In accordance with one of the main features of the invention, an improved annular stiffening band element indicated generally at 10, is mounted within the crown portion of the tire radially beneath the tread and extends circumferentially throughout the tire and extending generally throughout the width of the tread. Band 10 is operatively connected to the sidewall reinforcing elements 8 either physically or through the intervening elastomeric material of the crown portion and tread which bonds the band to the reinforcing elements and radially stabilizes the band. Band 10 is relatively thin in contrast to its width and can range in width between 6 and 12 inches and in thickness generally between 0.1 and 0.2 inches depending upon the particular tire in which it is bonded. It is also understood that tire 1 will have a usual innerliner, gum abrasive strips and other components present in a conventional pneumatic tire which are not shown in FIG. 1 or discussed in further detail.

As discussed above, one of the objects of the invention is the formation of band 10 so as to provide sufficient load carrying capability with improved endurance by eliminating or materially reducing interlaminar shear by forming the band of material strips having fibers which are oriented within the band element to extend across the neutral axis of the band. The band behaves as a tension member when the tire is pressurized and acts as a structural compression member when the tire is in the unpressurized state which allows loads to act over a substantial portion of the circumference of the tire.

Figure 2:
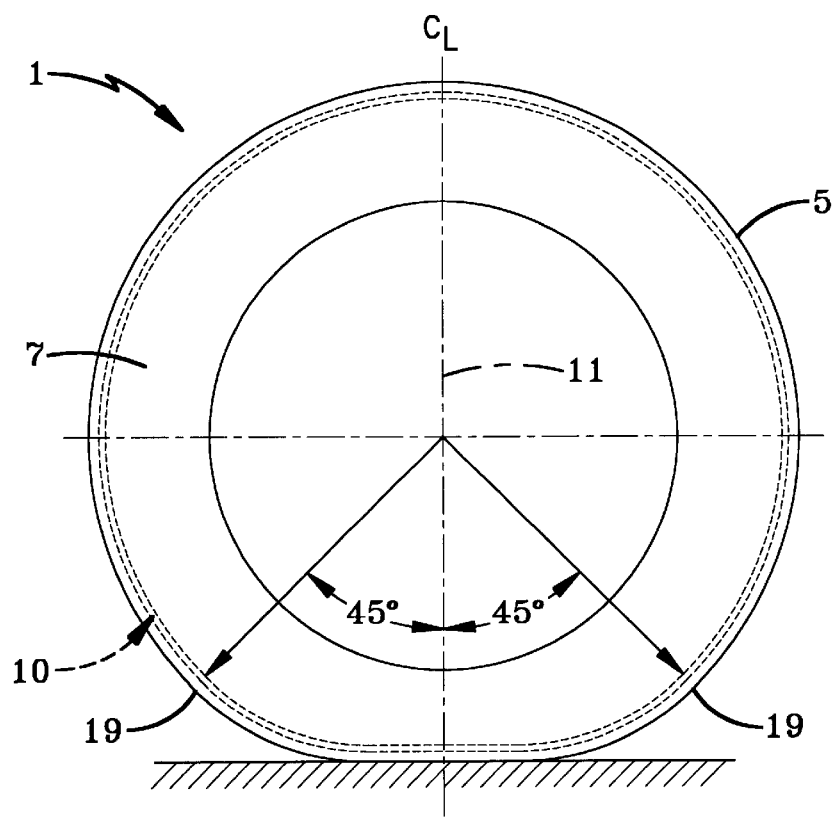
FIG. 2 is a diagrammatic side elevational view showing a run flat banded tire in an inflated deflected position.
Figure 3:
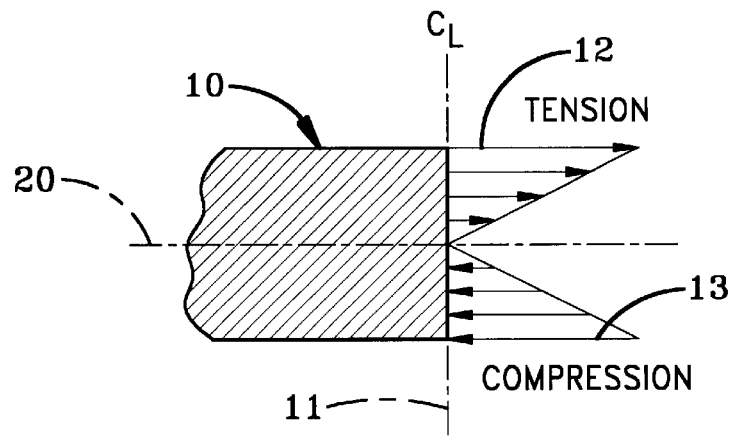
FIG. 3 is a greatly enlarged fragmentary diagrammatic view showing the forces exerted on a band element in the central footprint region of the inflated deflected banded tire of FIG. 2.

FIG. 2 shows tire 1 in an inflated deflected condition in which band element 10 in the central footprint region, flattens and conforms to the road surface for a short distance on both sides of the center line 11 of the tire. Thus, in the central footprint region, the band element geometry has changed from being circular in the inflated undeflected condition to being flat in the inflated deflected position. A diagrammatic enlargement of the band element in the central footprint region is shown in FIG. 3. The change in band element axial geometry from circular to flat merely reflects the change in stress/strain regime within the band element caused by flattening of the band element. Consequently, in the central footprint region, the fibers along the inside diameter of the band element are in tension and elongate as shown by arrows 12 while the fibers along the outside diameter of the band element are in compression and are shortened as depicted by arrows 13.

Figure 4:
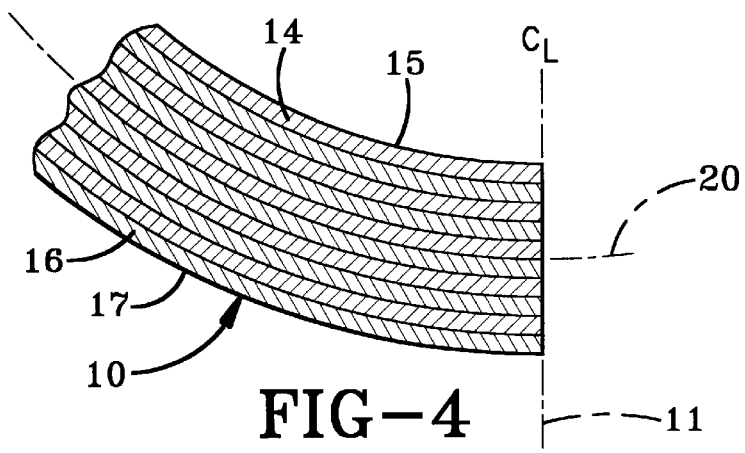
FIG. 4 is a fragmentary diagrammatic view of a multi-layered tape composite band prior to deflection.
Figure 5:
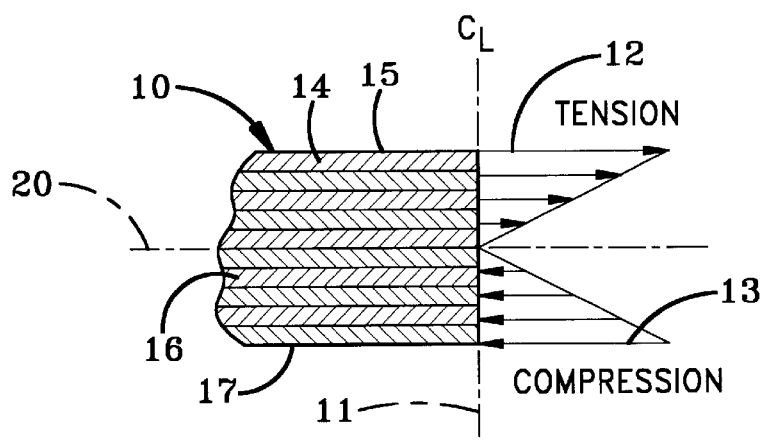
FIG. 5 is a greatly enlarged diagrammatic view showing the forces exerted on the multilayered tape composite band element of FIG. 4 in the central footprint region of a tire.

In the uninflated deflected banded tire (not shown), the sidewall undergoes significantly more deflection vs. the inflated deflected condition shown in FIGS. 2 and 3. For this condition, the band element and the central footprint region conforms to the road surface for a longer distance on either side of the center line of the tire vs. the inflated condition as shown in FIG. 2. An enlargement of a band element formed of a multilayered tape composite in this uninflated deflected condition is shown in FIGS. 4 and 5 and is similar to that represented in FIG. 3 which represents a homogenous band. Here again, fibers 14 in tape layers 15 along the inside diameter of the band are in tension while fibers 16 in tape layers 17 along the outside diameter of the band are in compression. Thus, although banded tire deflection is greater uninflated vs. inflated, the band element stress/strain regime in the central footprint region is basically the same for both conditions.

Although the critical design stress in the outer fibers of the band element occurs in the central footprint region, an additional cyclic stress exists forward and behind the footprint region in a general area indicated by numeral 19 in FIG. 2, wherein the outer fibers of the band element are in maximum tension, approximately 45° ahead of and 45° behind center line 11 of the footprint. This condition increases with deflection and accounts for the lower band element fatigue life for the uninflated condition vs. the inflated operation. The fatigue spectrum for the band element fibers on the outside diameter is a combination of the dominant road contact (compression) plus two additional cycles of lower stress (tension). Similarly, the fatigue spectrum for band fibers on the inside diameter is a combination of the dominant road contact (tension) plus two additional cycles of lower stress (compression).

It is also a fact that when band 10 flattens in the central footprint region, there is a natural shearing affect within the band element. This condition must exist in order for the inside diameter band fibers 14 to elongate while the outside band fibers 16 are shortened. This internal band element shearing described as transverse shear, is shown in FIG. 5 and is present to some degree regardless of band construction. FIGS. 4 and 5 depicts a multilayer tape composite band element composed of a multitude of layers of fiber resin tapes indicated at 15 and 17, which are wound in a plurality of layers. In this case, the transverse shear stress between the multilayer fiber/resin layers or tapes is called interlaminar shear stress. As shown in FIG. 5, the tension and compression forces imposed on the band element upon flattening in the central footprint region induces identical levels of transverse shear stress. Thus, regardless of whether the band element is made of homogenous filament wound material or a multilayer tape/fiber resin composite, the strain/stress regime and transverse shear develops to some degree upon flattening of the band element in the central footprint region because the outer fiber (inside diameter and outside diameter) stresses are proportional to the strains.

The magnitude of the interlaminar shear stress which initially develops along the neutral axis 20 of the band, is dependent upon the tension and compression stresses indicated in the outer fibers of the band element. The outer fiber tension and compression stresses are in turn dependent on the strains induced by flattening of the band element. The strain in the outer fibers of the band element in the central footprint region can be approximated by the following equation: $\epsilon = t/D$.

Assuming the band element begins circular and is deflected flat in the central footprint region, the magnitude of the tension and compression stresses in the outer fibers of the band element in this region are dependent upon the following: Radius (of diameter "D") of the undeflected band element in the axial direction. Radial thickness "t" of the band element.

The radius of the band element is largely determined by the tire size and thus can be changed only within narrow limits. The band element radial thickness will be determined so as to give acceptable band element outer fiber endurance as experienced by those fibers alternating between tension and compression.

Banded tire durability, including both inflated and uninflated conditions, is limited by the interlaminar shear strength of the band element. More specifically, band element durability, limited by failure due to interlaminar shear, initiates near the axial ends 21 (FIG. 1) of the band element along neutral axis 20 and progresses toward the axial center 22 of the band element. This characterization of durability failure within the band element is typical for both filament wound and multilayer tape, tape composite band element constructions. However, in the case of the multilayer tape composite band element, it is necessary to distinguish between interlaminar shear stress failure within the individual layers of the band element or interlaminar shear stress failure at an interface between layers of the multilayer tape composite band element. Generally, interlaminar shear strength is greater within the individual layers vs. between the layers. Nevertheless, in each case, the interlaminar shear failure is the result of the resin failing in shear. That is, the fibers within the fiber/resin composite do not fail. Rather, it is the shear strength of the resin which largely determines the strength of the band element within each layer or between the layers. In all these cases, it would be advantageous to increase the resistance to interlaminar shear stress of the band element and thereby improve band element durability by more effectively utilizing the strength of the fibers within the composite band element.

Prior art techniques to improve band element durability have been explored. For example, an epoxy fiber filled coating on the edges of the band or an epoxy laminated glass fiber tape bonded to the axial ends of the band element have shown positive results. For multilayer tape composite band elements, efforts to improve shear strength between composite layers include increasing the percentage of resin to reinforcing fiber around the neutral axis for thermoplastic composites. For thermoset composites, an increase in elastomeric additives within the epoxy around the same neutral axis area can provide an increase in shear strength between layers of the multilayer tape composite band element.

It is the purpose of this invention to increase interlaminar shear strength not only near the axial ends 21 of the band element but also across the entire axial length of the band element and thereby improve band element durability by fabricating the composite band element in such a manner that fibers run across the neutral axis.

Figure 6:
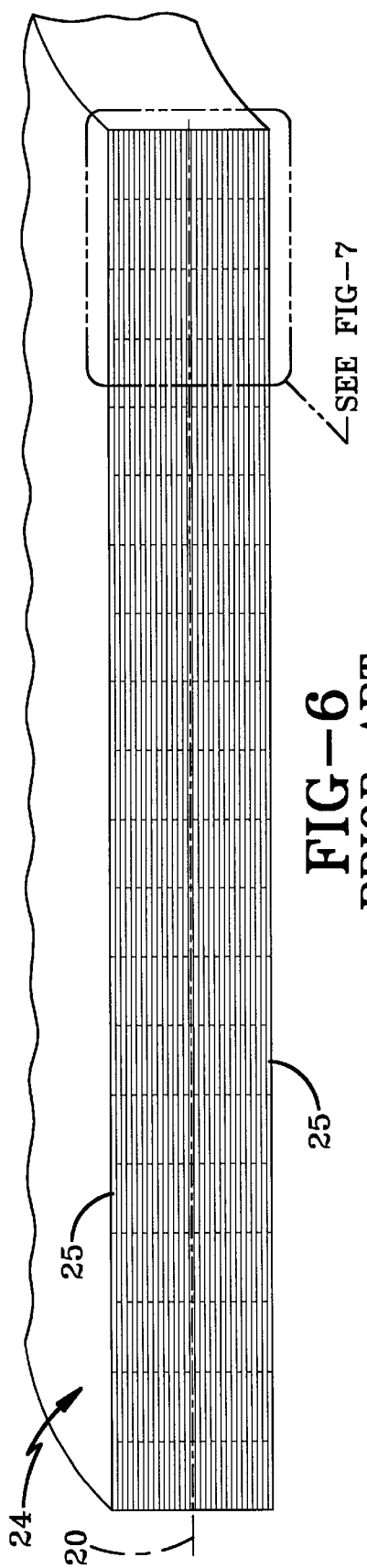
FIG. 6 is a fragmentary diagrammatic view with a greatly enlarged end section of a prior art multilayer tape composite band element with each layer being made up of a finite number of widths of tape placed in a side-by-side fashion.
Figure 7:
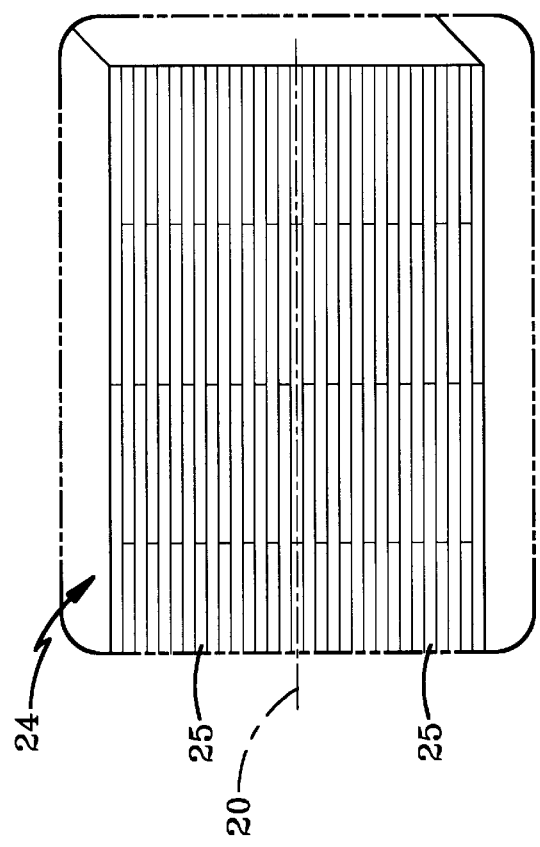
FIG. 7 is a further enlarged view of the encircled portion of FIG. 6.

FIG. 6 is a diagrammatic sectional view of a prior art multilayer tape composite band element. In a micro sense, this band element 24 consists of a finite number of layers, with each layer being made up of a finite number of widths or tapes 25 placed in side-by-side fashion, and with each tape being made of a combination of many fibers embedded in a suitable resin or matrix. Also, within each layer, all the tapes will have a certain angle of orientation. In the fabrication of the multilayer tape composite band element 24, tapes 25 in each layer may be placed on a cylindrical surface or mandrel perpendicular to the band element axis, or with an angular orientation relative to the normal of the band element axis as shown in pending patent application Ser. No. 08/782,364, the contents of which are incorporated herein by reference, in a heated state and wrapped under pressure. The essence of this invention is. not the number or angular orientation of these layers, but the fiber orientation locally within the individual tapes and globally within the layers.

Fiber orientation is better understood by referring to FIG. 8, which depicts a conventional tape 26 prior to being placed upon the building mandrel. Tape 26 has a pair of opposed flat side surfaces 28a and 28b and opposed longitudinal edges 28c and 28d. The composite tape consists of a resin 27 or matrix which binds numerous fibers 28 together and which, as a thermoplastic aggregate, can be handled as necessary during the fabrication process. The orientation of the numerous fibers 28 within this tape are basically aligned longitudinally with the length of the tape.

In the fabrication of conventional tapes 26 as just described, the fibers 28 are oriented longitudinally owing to the pultrusion process of resin/fiber preparation. In light of this, it is not likely to arrange the fibers in any way but longitudinally. Thus, in order to improve interlaminar shear strength, either within layers or between layers of a multilayer tape composite band element using conventional tapes, clearly an alternative approach is needed.

This alternative approach begins with a conventional thermoplastic composite tape 26 which is subsequently modified by applying a wrap or twist per unit length as shown in FIG. 9. Tape 26 is twisted until the successive turns close in on each other such that the twisted tape 30 assumes a circular cross section throughout its entire length, as shown in FIG. 10. This twisted tape 30 then is pultrated through a square or rectangular die 31 as shown in FIG. 11, where it now assumes a rectangular configuration. The purpose of the square or rectangular die 31 is to impart sharp corners 33 to the twisted tape 30 so that when placed upon a mandrel 35 (FIG. 12A) in a heated state under pressure, the likelihood of entrapping air within the composite is minimized. Small amounts of trapped air or voids decrease strength, shear strength, fatigue life and band element durability. However, if desired, twisted tape 30 could be wrapped about a mandrel to form a band layer without first being pultrated into a rectangular configuration.

Referring to FIG. 12, in this sectional view looking along the length or longitudinal direction of the twisted tape 30, the fibers 28 now spiral and cross over the neutral axis 35 of the individual twisted tape 30. This now leads to the preferred embodiment of the composite multilayer tape band 10 depicted in FIGS. 13 and 14. Here a plurality of outside layers 37 and inside layers 38 of the band consists of strips of conventional tapes 26 wound in layers with or without angular orientation as described in detail in said pending application Ser. No. 08/782,364. The middle or central layer 40 near neutral axis 20 of the band 10 consists of tape made of twisted, pultrated fibers as shown in FIG. 11. As explained earlier, the maximum interlaminar shear stress occurs along neutral axis 20 as the band deflects in the central footprint region and 45° ahead and behind the footprint region.

Figure 15:
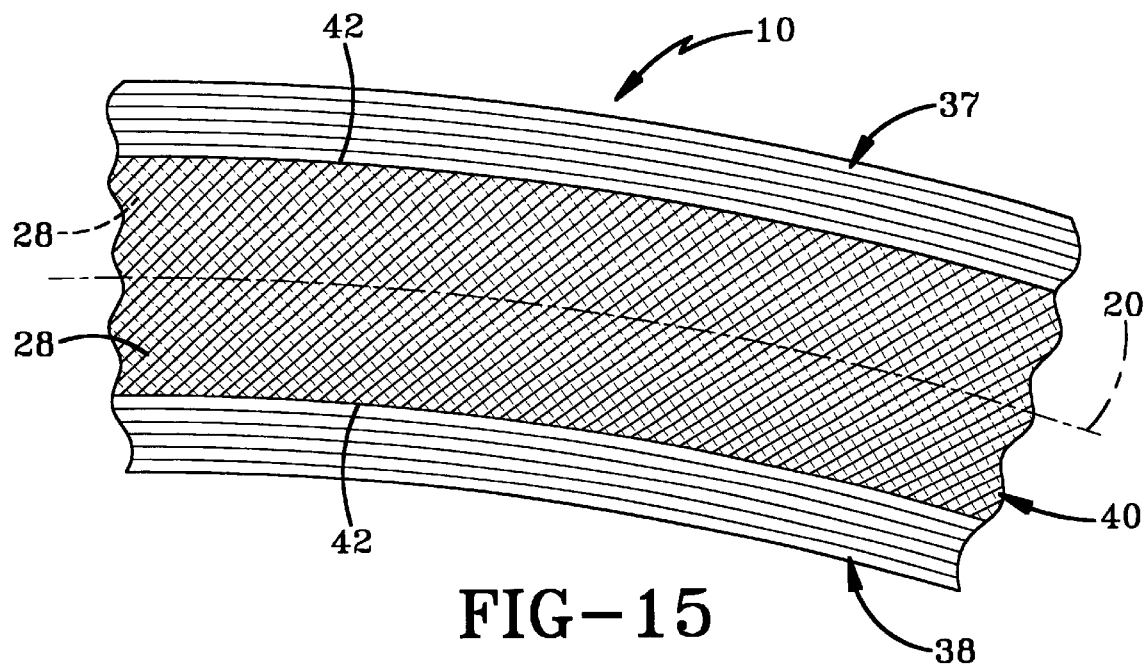
FIG. 15 is a greatly enlarged diagrammatic sectional view of the band element of FIGS. 13 and 14 taken on line 15—15, FIG. 13.

Now in the preferred embodiment, the neutral axis 20 of the band benefits by having many layers of twisted fibers 28 run across the neutral axis and assume a much larger role in resisting interlaminar shear. FIG. 15, which is an axial or end view of the preferred embodiment of band 10, further illustrates the effect near neutral axis 20 of the twisted, pultrated tapes 30 and how the fibers 28 clearly cross the neutral axis. Also, the first interface 42 between the central core 40 of the twisted layer and either the inside layers 38 or outside layers 37 is well removed from neutral axis 20. The amount of twist per unit length can vary depending upon the desired dimensions of the tape, but the preferred amount of twist would achieve approximately a 45° angle relative to the longitudinal axis of the tape.

As shown in FIGS. 13 through 15, the preferred embodiment of the multilayer tape composite band consists of the following dimensional ranges: axial Width "w" determined by the tire size; thickness "t" determined by the thickness necessary for band element durability; thickness of the twisted tape layer equal to approx. ½ the band element thickness; thickness of the inside layers and outer layers equal to approximately ¼ the band element thickness; angle of twisted tape approximately 45° relative to the longitudinal axis of the tape.

In partial summary, a preferred embodiment has been disclosed for the multilayer tape composite band 10 which provides for multiple layers of fibers 28 to cross neutral axis 20 of the band and enhance interlaminar shear strength. Also, there are now fewer interfaces 42 between the layers, and they have been moved a comfortable distance away from the neutral axis 20 owing to the thickness of the central twisted layer 40. Consequently, the fatigue strength and durability of the band element will be correspondingly improved.

Figure 12A:
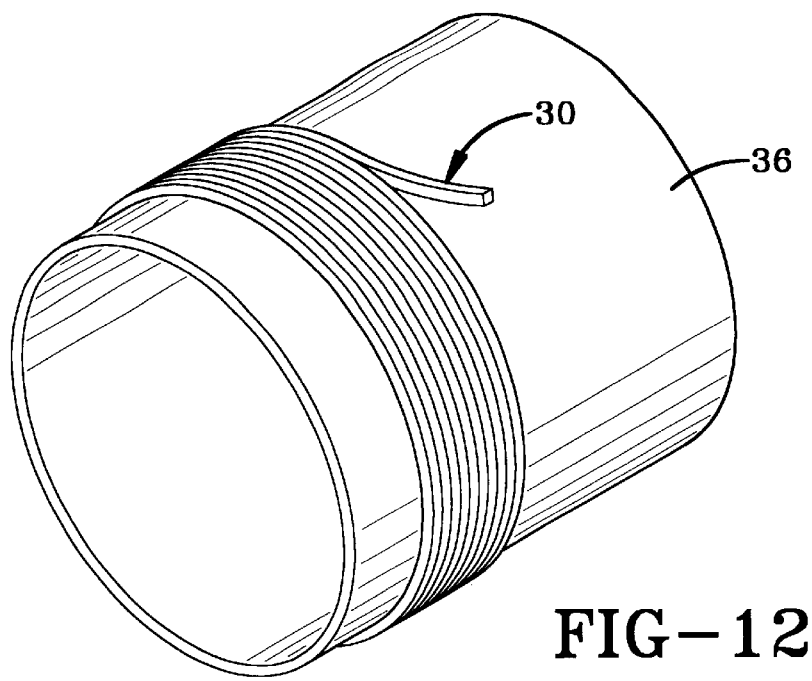
FIG. 12A is a diagrammatic perspective view showing the twisted pultrated tape strip of FIG. 11 being wound about a mandrel to form at least one layer of a band element.

The concept of twisting tapes as shown in FIG. 9 is not restricted to single tapes. FIG. 16 depicts the concept of twisting two tapes 26 and how the cross section can be altered. Once the twisted tapes have been passed through a suitable die for providing sharp corners, such as shown in FIG. 11, it can be placed upon the mandrel in conventional manner as shown in FIG. 12A. Obviously, the concept can be extended to three tapes and beyond. FIGS. 17 and 18 illustrate how two layers of tape 26 and 26A combine to make up each twisted tape and the resulting band 45 consisting of a central layer 46 formed of the double twisted tapes of FIG. 16 with outer and inner conventional layers 47 and 48, respectively, of composite tapes. The heavier lines in FIG. 18 show the orientation of tape 26A combined with the lighter lines of tape 26.

FIGS. 19 and 20 depict another band embodiment 53 and method for orienting conventional composite thermoplastic tape layers formed from strips of tapes 26 so that fibers 28 are running across the neutral axis 20 of the band. The construction of band 53 is achieved by winding tape 26 on a mandrel to provide a plurality of convolutions which are built up to form one monolithic thermoplastic band element. Inside layers 54 and outside layers 55 are placed according to prior art wherein the strips or tape 26 is placed about the mandrel in a direction generally parallel to the surface of the mandrel, while the central layer 56 is formed by winding tape 26 at an angle, such as 45°, relative to axis 20, whereby one of the longitudinal edges 58 of the tape convolutions abut against inner layers 54 which was previously formed on the mandrel and the opposite longitudinal edges 59 of the tape then providing the support for outer layers 55.

One method to form intermediate layer 56 would be to use a guide block extending about one end of the mandrel with a surface angled of approximately 45° against which the flat surfaces of the individual convolutions of tape 26 would be laid up against until sufficient layers or convolutions are wound about the mandrel to achieve the desired axial length of the band. It is readily seen that with this arrangement, the individual fibers 28 in the tape extend across neutral axis 20 to achieve the desired results. Again, the areas most susceptible to interlaminar sheer will be where edges 58 and 59 join with inner and outer layers 54 and 55, which areas are considerable distances from neutral axis 20.

FIGS. 21 and 22 depict still another band embodiment indicated generally at 60, for providing fibers 28 that cross the neutral axis 20 of the band to achieve the benefits discussed earlier. Band 60 is a multilayer tape composite band element consisting of a plurality of tape strips 26 wound about a mandrel in a manner such as shown in pending patent application Ser. No. 08/782,346 forming a plurality of layers, each separated by a boundary 62. Impressions 61 or dimples are made in the layers as they are deposited on the fabrication mandrel, such as with a roller die. The die makes the dimples in the layers such that subsequently applied layers fill in the depressions and thus provide a coupling or interfacial mechanical connection between the boundaries of adjacent layers. The pattern of dimples or projections can be placed randomly with high density and provide a significant improvement in interlaminar shear strength both within and between layers of the band element. The individual fibers in the dimple areas also extend across neutral axis 20 and across the plane or boundary 62 between adjacent tape layers where the interlaminar sheer is most likely to occur.

The above embodiments are for multilayer tape composite band elements. However, the present invention is also applicable to homogeneous filament wound bands. Homogeneous bands constructed of solid metal such as aluminum or steel are outside the scope of this invention. However, homogeneous composite bands able to benefit from this preferred twisted fiber approach is the filament wound band 65 illustrated in FIGS. 25 and 26. The cross section of a prior art filament wound composite band 65 shows a uniform distribution of fibers 66 embedded in a resin matrix 67. There are no distinct layers in this configuration, the composite band 65 is built up sequentially by filament winding one strand of small diameter fibers 66 upon another. This process is continued until the desired cross section is accumulated, and is applicable for either thermoplastic or thermosetting material. As described and shown in FIGS. 23 and 24, the band durability is limited by transverse shear failure originating near the neutral axis 20. Obviously, interlaminar shear failure is applicable in this case because of the fiber orientation.

However, modification of this prior art filament band construction according to the present invention, is the replacement of the central portion of the filament wound band 65 with a layer 69 of the twisted, pultrated tape as described previously. As shown in FIGS. 25 and 26, the benefit of this construction is to provide many fibers 28 running across the neutral axis 20 which utilizes the strength of the fibers to augment the resin matrix in resisting transverse shear, increasing fatigue life and improving band durability. Inner and outer layers 63 and 64, respectively, formed of the wound filament fibers 66 are provided about intermediate layer 69 which assists in achieving the benefits of both the filament fiber formed band and the twisted fiber reduction of interlaminar sheer.

It is readily understood that intermediate layer 69 can be formed according to the disclosure of FIG. 16 wherein two or more strips of tape 26 are placed in juxtaposition before being twisted and pultrated.

Another embodiment addresses both of the causes of composite band element failure. Recognizing that multilayer tape composite band elements fail due to excessive shear either within layers or between layers, band 70, shown in FIGS. 27 and 28 illustrates an arrangement which addresses both of these issues simultaneously. The band element 70 is formed from a single layer of the twisted pultrated tape as shown in FIGS. 11 and 12A without any inner or outer layers being applied thereto. It also can be formed as disclosed in FIG. 16 wherein a plurality of strips of tape 26 are placed in juxtaposition before being twisted. As discussed above, the twisted tape layer, such as indicated at 40, 46 and 69 in FIGS. 13–14, 17–18 and 25–26 greatly enhances shear strength owing to the fiber arrangement crossing the neutral axis 20 of the bands. Furthermore, the only interface between twisted tapes now is oriented in a plane 72 normal to the axis of the band. However, plane 72 is not subjected to high levels of shear stress. Now the following desirable situation exists: The interface between twisted layers doesn't align with the high shear stress plane. Thus, the interlaminar shear strength of the resin at this interface is better able to provide adequate fatigue life and band element durability; The shear strength within the twisted tapes is enhanced by the fiber orientation as explained above.

In summary, preferred embodiments have been disclosed for multilayer tape composite bands and homogeneous filament wound bands which provides for multiple layers of fibers which cross the neutral axis of the band element and enhance interlaminar shear strength. Also, the number of interfaces between the layers has been reduced or eliminated, depending on the embodiment chosen. Consequently, the fatigue strength and durability of the band will be correspondingly improved.

Accordingly, the improved lightweight annular band for a pneumatic tire is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved band for a pneumatic tire is constructed and used, the characteristics of the construction, and the advantageous, new and useful results obtained, the new and useful structures, devices, elements, arrangements, parts, combinations and method steps, are set forth in the appended claims.

What is claimed is:

1. A method of forming a thin annular band for embedding in a crown portion of a pneumatic tire including the steps of:

A) providing a thin flat strip of material formed with a plurality of longitudinally extending fibers embedded in a resin matrix;

B) twisting the strip until the strip assumes a substantially circular cross section throughout its length;

C) pultruting the twisted strip through a die to provide the strip with a substantially rectangular cross section;

D) wrapping the pultruted strip about a mandrel to form the band having a plurality of adjacent convolutions of said pultruted twisted strip; and E) forming inner and outer layers about the band by wrapping a first homogenous filament about the mandrel before wrapping the pultruted twisted strip thereon then wrapping a second homogenous filament over the band formed from the pultruted twisted strip layer.

2. The method defined in claim 1 including the step of placing a plurality of the thin strips of material in elongated juxtaposition prior to twisting the strip in step (B).

* * * * *